United States Patent

Higeta

(10) Patent No.: US 8,340,502 B2
(45) Date of Patent: Dec. 25, 2012

(54) MOVIE REPRODUCING APPARATUS AND METHOD

(75) Inventor: Tatsuya Higeta, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 12/952,630

(22) Filed: Nov. 23, 2010

(65) Prior Publication Data

US 2011/0129200 A1    Jun. 2, 2011

(30) Foreign Application Priority Data

Dec. 1, 2009   (JP) ................................. 2009-273892
Sep. 10, 2010  (JP) ................................. 2010-203155

(51) Int. Cl.
*H04N 9/88* (2006.01)
*H04N 9/94* (2006.01)

(52) U.S. Cl. ........ 386/263; 386/264; 386/270; 386/271; 348/425.2; 375/240.27; 379/114.04; 396/404; 396/409

(58) Field of Classification Search .......... 386/263–264, 386/270–271; 348/425.2; 375/240.27; 379/114.04; 396/404, 409

See application file for complete search history.

(56) References Cited

U.S. PATENT DOCUMENTS

| | | | | |
|---|---|---|---|---|
| 5,534,928 A | * | 7/1996 | Iwamura | 375/240.13 |
| 5,727,113 A | * | 3/1998 | Shimoda | 386/326 |
| 6,061,496 A | * | 5/2000 | Nakamura et al. | 386/337 |
| 2005/0180733 A1 | | 8/2005 | Yatomi | |
| 2007/0140674 A1 | * | 6/2007 | Nomura et al. | 396/52 |
| 2009/0196583 A1 | * | 8/2009 | Murakami | 386/126 |
| 2010/0086280 A1 | * | 4/2010 | Sabo | 386/68 |

FOREIGN PATENT DOCUMENTS

JP   2005-229395 A   8/2005

\* cited by examiner

*Primary Examiner* — Helen Shibru
(74) *Attorney, Agent, or Firm* — Canon U.S.A., Inc., IP Division

(57) ABSTRACT

If a movie reproducing apparatus detects an error during reproduction of encoded movie data, based on management information that includes a recording position of an intra-picture coded picture included in the encoded movie data, the movie reproducing apparatus determines a position used when the error is recovered by searching for an intra-picture coded picture subsequent to a frame including data with the error as well as updates elapsed time information to be displayed based on a frame number of the searched intra-picture coded picture at the time the error is recovered.

10 Claims, 11 Drawing Sheets

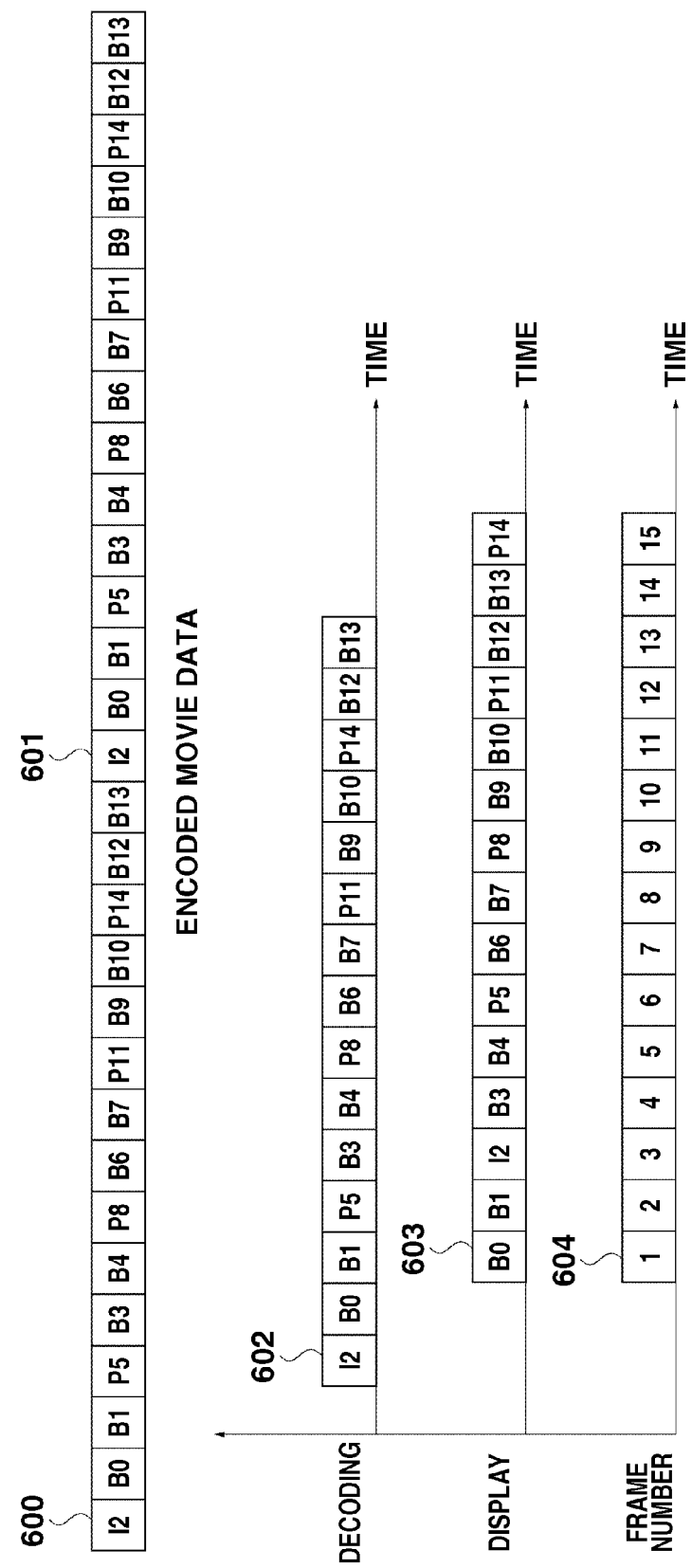

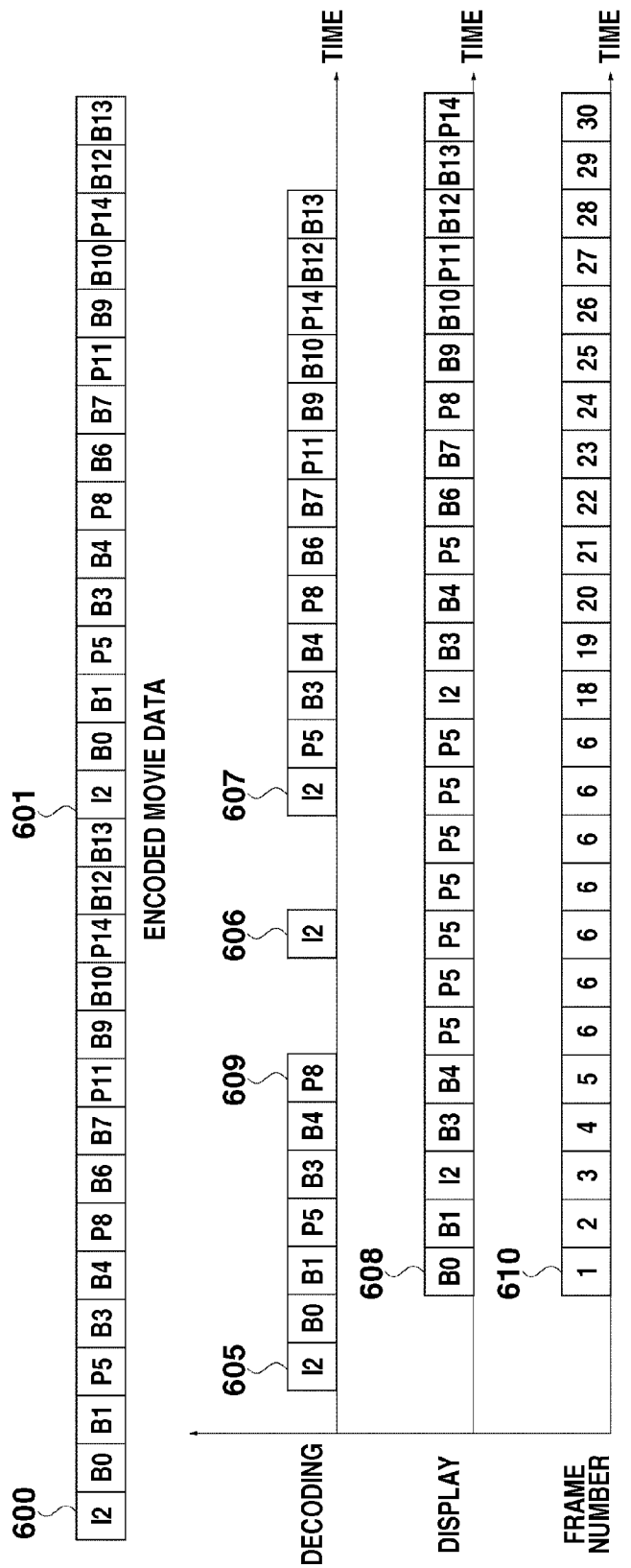

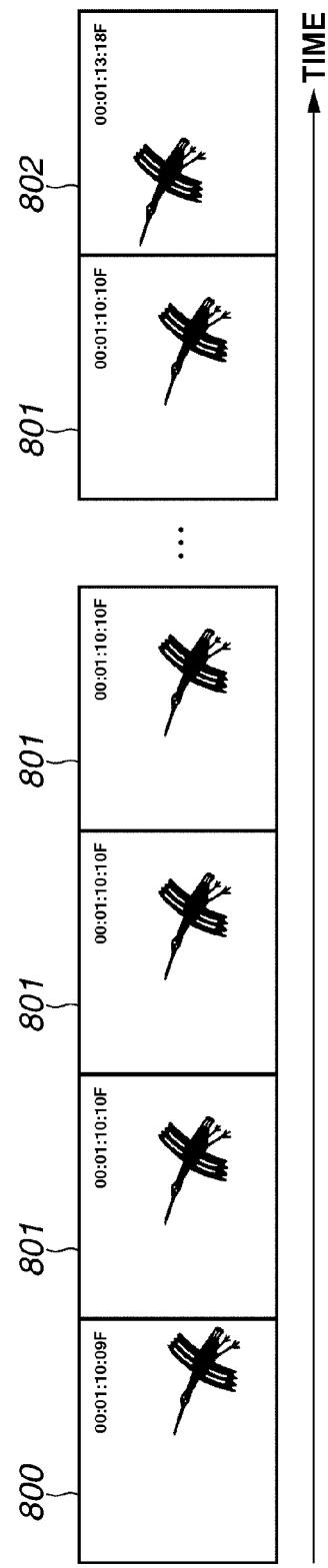

MOVIE REPRODUCING APPARATUS AND METHOD

BACKGROUND OF THE INVENTION

1. Field of the Invention

The present invention relates to a movie reproducing apparatus and method. More particularly, the present invention relates to a technique used for recovery from an error that occurred during reproduction processing.

2. Description of the Related Art

As a high-efficiency encoding format of movie data, there are known the Moving Picture Experts Group (MPEG) format and the next-generation H.264 format. Further, recording and reproducing apparatuses that record and reproduce movie data which has undergone compression coding by, for example, MPEG-2 are widely used.

The coding method of MPEG systems uses intra-frame coding that uses only the image data in a same frame for encoding and inter-frame prediction coding that uses a prediction error with a reference frame. For example, according to MPEG-2, coding processing that uses a combination of I picture that is intra-frame coded data, P picture that is forward predictive coding data, and B picture that is bidirectional predictive coding data is used.

Further, a structure called group of pictures (GOP) is introduced as a coding unit into coding standards such as MPEG-2. Generally, a GOP contains one I picture and a predetermined number of P and B pictures. The GOP begins with I picture in a coding order. I picture is followed by P pictures at a regular interval, and B pictures are in the remaining gaps. The encoding is performed in an order different from the order the frame is input (display order). For example, the pictures in the GOP is encoded in the order of I2, B0, B1, P5, B3, B4, P8, B6, B7, P11, B9, B10, P14, B12, and B13. The alphabets I, B, and P represent a picture type, and the figures represent the display order (the first picture is "0"). Although the above-described GOP structure is an example, generally, one GOP contains 15 frames. Further, I picture or P picture usually appears every three frames. Stream data including continuous GOPs is recorded in a recording medium by a recording and reproducing apparatus.

When the encoded movie data is reproduced, the encoded movie data is decoded in the order the data has been encoded. Then the order of the decoded data is changed and arranged into a display order. The frame images are output in this order. In this way, the reproduction display of the movie data is performed. For example, decoding is performed in the order of I2, B0, B1, P5, B3, B4, P8, B6, B7, P11, B9, B10, P14, B12, and B13 and display is performed in the order of B0, B1, I2, B3, B4, P5, B6, B7, P8, B9, B10, P11, B12, B13, and P14.

As described above, since the inter-frame prediction coding system is employed in the MPEG systems, if data error of a reproduction frame occurs, the number of the missing frames may not be limited to one frame. In other words, missing data of several consecutive frames may occur. Japanese Patent Application Laid-Open No. 2005-229395 discusses a measure that can be taken when an error of reproduced encoded movie data is detected. Japanese Patent Application Laid-Open No. 2005-229395 discusses a technique used in replacing encoded movie data in an error period with data of a normal frame image directly before the occurrence of the error.

The technique discussed in Japanese Patent Application Laid-Open No. 2005-229395 uses Decoding Time Stamp (DTS) that is a time stamp of the coded data which has been added to system data for the calculation of the error period.

However, all encoded movie data does not always include time stamp information indicating coding time and display time represented by DTS. In fact, whether the time stamp information is included or not depends on the recording format of the encoded movie data. For example, the time stamp is defined to be essential for some of the formats used for recording coded data of MPEG-2 on a digital versatile disc (DVD). However, the time stamp is not essential for formats used in recording information on memory cards or hard disks. Thus, a large amount of movie data that does not include time stamp information exists.

If an error such as missing data occurs during reproduction of encoded movie data obtained from an arbitrary recording medium, and if the encoded data to be reproduced is in a format of encoded movie data that includes time stamp information discussed in Japanese Patent Application Laid-Open No. 2005-229395, the number of the missing frames and the frame which is currently being reproduced after the recovery from the error can be determined by referring to the time stamp information of the normal data after the error of the movie data has been recovered from the data missing error. Even if the format of the encoded movie data does not include time stamp information, the frame which is being reproduced can be determined by counting the frame numbers on condition that the reproduction is performed normally. However, once data missing occurs, even if the data missing is ended, the frame that is currently reproduced will be uncertain. At this time, if a time code (elapsed time information) of the reproduction data is displayed, when the data missing is ended, the continuity of the displayed time will be discontinued or a time code that does not correspond to the frame that is actually reproduced may be displayed. Further, even if the user desires to confirm the portion of the encoded movie data that has exhibited missing data when the data missing has occurred while the encoded movie data is being reproduced, if the time stamp information is not included, the user is unable to obtain the information as it is difficult to identifiably display the position and the number of the missing frames.

SUMMARY OF THE INVENTION

The present invention is directed to a method capable of determining a frame image which is being reproduced and displaying correct time information after an error is recovered, even if the error occurs during reproduction of encoded movie data that does not include time stamp information. Further, the present invention is directed to a method capable of displaying information of a period during which an error such as data missing occurred, even if the error occurs during reproduction of encoded movie data that does not include time stamp information.

According to an aspect of the present invention, a movie reproducing apparatus for reproducing encoded movie data that does not include time stamp information includes a reproduction unit configured to reproduce the encoded movie data from a storage medium, a decoding unit configured to decode data reproduced by the reproduction unit, a display unit configured to display a moving image and elapsed time information of the moving image based on data decoded by the decoding unit, an error detection unit configured to detect an error of the data reproduced by the reproduction unit, a storage unit configured to store management information indicating a recording position of an intra-picture coded picture included in the encoded movie data, and a control unit configured to perform a control in such a manner that if the error is detected by the error detection unit while the reproduction unit is reproducing, based on the management information stored in the storage unit, an intra-picture coded picture subsequent to a frame including data with the error is searched for and the error is recovered, and when the error is recovered, the display unit updates elapsed time information to be displayed based on a frame number of the intra-picture coded picture searched by the control unit.

According to an aspect of the present invention, a movie reproducing apparatus for reproducing encoded movie data that does not include time stamp information includes a reproduction unit configured to reproduce the encoded movie data from a storage medium, a decoding unit configured to decode data reproduced by the reproduction unit, a display unit configured to display a moving image and elapsed time information of the moving image based on data decoded by the decoding unit, an error detection unit configured to detect an error of the data reproduced by the reproduction unit, a storage unit configured to store management information indicating a recording position of an intra-picture coded picture included in the encoded movie data, and a control unit configured to perform control in such a manner that if the error is detected by the error detection unit while reproduction is performed by the reproduction unit, based on the management information stored in the storage unit, an intra-picture coded picture subsequent to a frame including data with the error is searched for and the error is recovered, and when the error is recovered, the display unit updates elapsed time information to be displayed based on a frame number of the intra-picture coded picture searched for by the control unit and displays error information that includes a period of a frame dropped caused by the error or a number of dropped frames caused by the error.

According to an aspect of the present invention, a movie reproducing method for reproducing encoded movie data that does not include time stamp information includes reproducing the encoded movie data from a storage medium, decoding the reproduced data, displaying a moving image and elapsed time information of the moving image based on the decoded data on a display, detecting an error of the reproduced data, storing management information indicating a recording position of an intra-picture coded picture included in the encoded movie data; and performing a control in such a manner that if the error is detected during reproduction of the encoded movie data, based on the stored management information, an intra-picture coded picture subsequent to a frame including data with the error is searched for and the error is recovered, updating elapsed time information to be displayed on the display based on a frame number of the intra-picture coded picture searched by the control unit, when the error is recovered.

According to an aspect of the present invention, a movie reproducing method for reproducing encoded movie data that does not include time stamp information including reproducing the encoded movie data from a storage medium, decoding the reproduced data, displaying moving image and elapsed time information of the moving image based on the decoded data on a display, detecting an error of the reproduced data, storing management information indicating a recording position of an intra-picture coded picture included in the encoded movie data, performing a control in such a manner that if the error is detected during reproduction of the encoded movie data, based on the stored management information, an intra-picture coded picture subsequent to a frame including data with the error is searched and the error is recovered, and updating elapsed time information to be displayed on the display based on a frame number of the intra-picture coded picture searched by the control unit as well as displaying error information indicating a period of frames dropped by the error or a number of frames dropped by the error, when the error is recovered.

Further features of the present invention will become apparent from the following description of exemplary embodiments (with reference to the attached drawings).

BRIEF DESCRIPTION OF THE DRAWINGS

FIG. 6 illustrates decode timing and display timing of each frame image of encoded movie data.

FIG. 7 illustrates decode timing and display timing of each frame image when an error has occurred.

FIGS. 8A to 8E illustrate error information which is displayed after recovery from an error.

DESCRIPTION OF THE EMBODIMENTS

Now, exemplary embodiments of the present invention will be described in detail with reference to the drawings.

Figure 1:
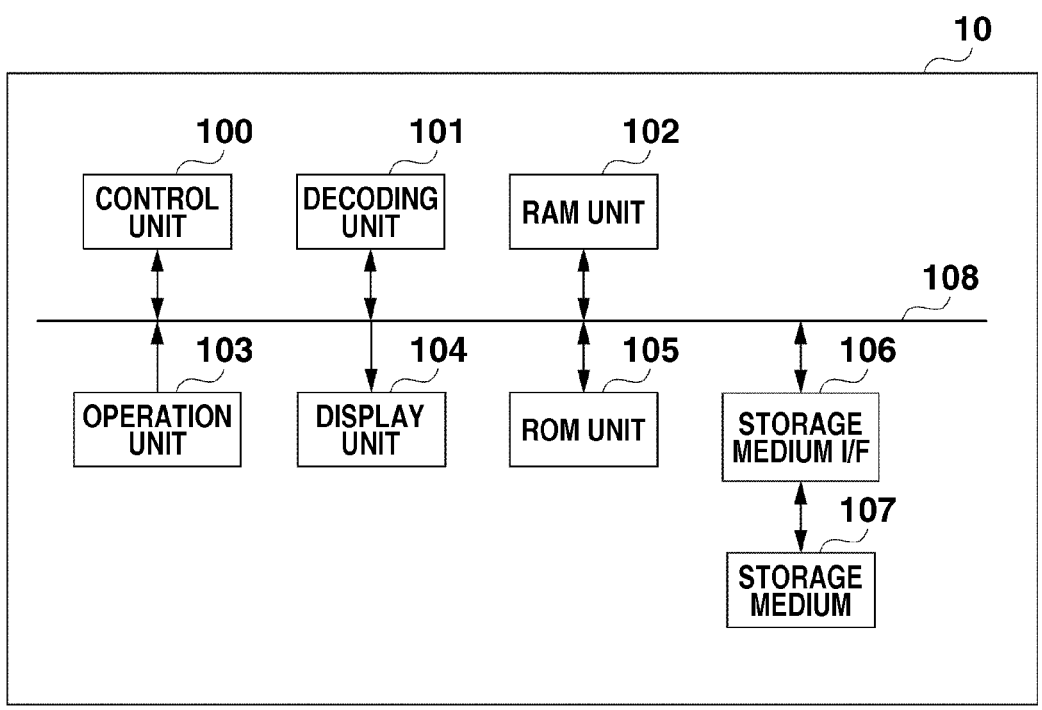
FIG. 1 is a block diagram illustrating a configuration of a movie reproducing apparatus according to an exemplary embodiment of the present invention.

FIG. 1 is a block diagram illustrating a configuration of a movie reproducing apparatus 10 according to an exemplary embodiment of the present invention. The movie reproducing apparatus 10 includes a control unit 100, a decoding unit 101, a random access memory (RAM) unit 102, an operation unit 103, a display unit 104, a read-only memory (ROM) unit 105, a storage medium interface (I/F) 106, a storage medium 107, and a bus 108. The movie reproducing apparatus 10 may also be constructed as a video camera including an imaging unit (camera) (not shown).

The control unit 100 performs operation control of each of the above-described units and includes a computer such as a central processing unit (CPU). The control program executed by the control unit 100 is stored in the memory in the ROM unit 105. Further, data is transmitted between the above-described units via the bus 108. The operation unit 103 includes various operation keys which serve as an interface with the user. If execution of a reproduction operation is instructed by using the operation unit 103, the reproduction operation is executed by the control unit 100. At that time, the storage medium I/F 106 functions as a reproduction unit. Thus, the storage medium I/F 106 reads out the encoded movie data stored in the storage medium 107 and stores the data in the RAM unit 102. The RAM unit 102 functions as a buffer memory.

The decoding unit 101 reads out the encoded movie data stored in the RAM unit 102 and decodes the data according to a predetermined coding method. The predetermined coding system is, for example, MPEG-2 or H.264, which uses coding processing including intra-frame coding and inter-frame prediction coding. The intra-frame coding uses only the image data in the same frame. The inter-frame prediction coding uses a predicted difference between reference frames. The encoded movie data according to the present exemplary embodiment includes intra-picture coded picture (I picture), forward prediction coded picture (P picture), and bidirectional prediction coded picture (B picture).

The movie data decoded by the decoding unit 101 is supplied to the display unit 104 via the RAM unit 102 as display image data. The display unit 104 is a monitor including a liquid crystal display. The display unit 104 receives the display image data and outputs a display image.

The decoding unit 101 includes a decoding function used for decoding the encoded movie data which has undergone the compression coding and an error detection function used for detecting an error of the data to be decoded. Further, the decoding unit 101 includes a function used for generating a frame number and a time code, which are a part of the display image data. By using the error detection function, the decoding unit 101 detects an error due to, for example, missing reproduction data. The above-described error is an error that occurs due to, for example, data read-out failure or failed recording data.

Figure 2:
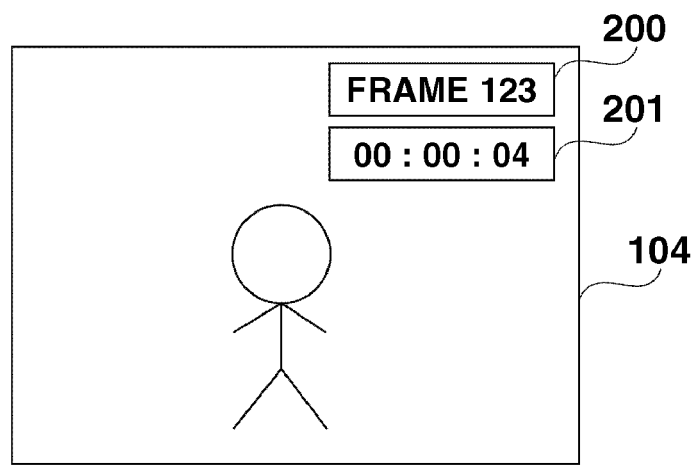
FIG. 2 illustrates an example of a display during reproduction operation.

FIG. 2 illustrates an example of a screen displayed by the display unit 104 during the reproduction operation. A frame image of the decoded moving image is displayed as a main picture on the display unit 104. Further, as additional information of a reproduced moving image, the display unit 104 displays a frame number display 200 of the frame image that is being displayed and a time code display 201 that is the elapsed time information (reproduction time) of the moving image. The frame number display 200 and the time code display 201 visualize the information generated by the decoding unit 101. Both of the frame number display 200 and the time code display 201 are not necessarily displayed. The display is acceptable if either of them is displayed.

In FIG. 2, the frame number display 200 indicates that the 123-th frame is displayed as the frame image. Each time the frame image displayed on the display unit 104 is updated, the frame number that is displayed is also updated. The frame number is generated by the decoding unit 101 by referring to predetermined management information (system data) included in the encoded movie data. The predetermined management information will be described below with reference to FIG. 3. Time code display 201 indicates that the current time is 00 (hour):00 (minute):04 (second). The time code is information indicating reproduction time generated by the decoding unit 101 based on the frame number. The frame number is converted into units of seconds. If one second includes 30 frames and the 123-th frame image is displayed, 4 seconds (123/30=4) will be displayed. If the data is reproduced not from the top of the encoded movie data but from the middle of the data, the decoding unit 101 determines the I picture to be decoded first as the offset frame, and then acquires the frame number of the offset frame (I picture). Then, by adding the frame number of the offset frame and the frame number of the frame after the reproduction is started again, the time code to be displayed is generated.

Figure 3:
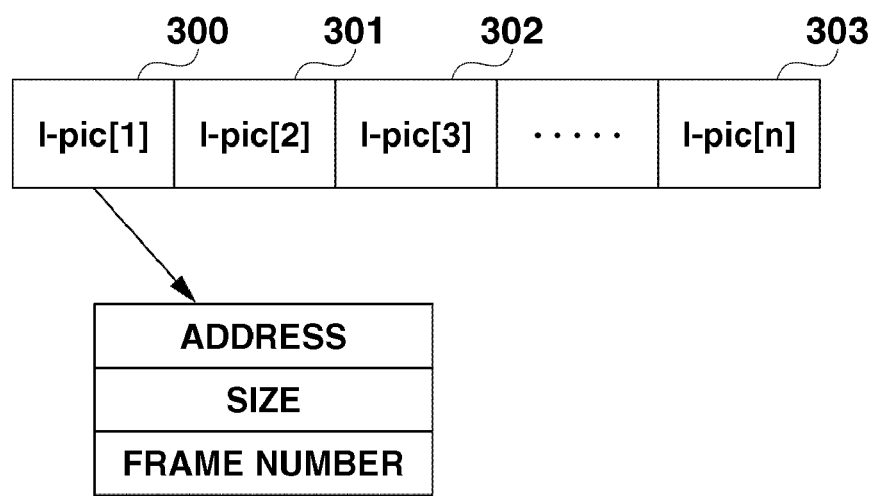
FIG. 3 illustrates a structure of management information data.

FIG. 3 illustrates a structure of the management information data applied to the present exemplary embodiment. The management information data (system data) is multiplexed over the encoded movie data and stored in the storage medium 107. In FIG. 3, each of frames 300, 301, 302, and 303 presents information of I picture included in the encoded movie data. The information of I picture includes "address", "size", and "frame number" information. The address information indicates a recording position of each I picture in the storage medium 107. The size information indicates a data size of the I picture. The frame number indicates the frame number counted from the top of the encoded movie data. At the time of data reproduction, the decoding unit 101 reproduces and acquires the management information data illustrated in FIG. 3 before it decodes the encoded movie data (stream). When the data is being reproduced, the information of the I picture acquired in advance and the I picture to be reproduced are compared. In this manner, the stream progress and timing of the I picture is monitored. If an error occurs during the reproduction, by using information of a frame which has been decoded directly before the occurrence of the error, the position of the subsequent I picture can be searched. In this manner, the decoding can be resumed from the searched I picture after the occurrence of the error. The form of the address indicating a recording position of the I picture on the storage medium is not limited to the form illustrated in FIG. 3 and may be in any form so long as the recording position of the intended I picture in the storage medium 107 such as the offset address from the top of the file is determined.

Next, the reproduction operation will be described with reference to FIG. 6. FIG. 6 illustrates decode timing and display timing of each frame image of the encoded movie data. GOPs 600 and 601 are the GOPs of the encoded movie data stored in the storage medium 107. The GOPs 600 and 601 include a combination of 15 pictures (I2 to B13). In FIG. 6, the alphabets I, B, and P represent a picture type and the figures represent the display order (figure of the first picture is 0). Timing 602 indicates the timing each frame of the GOP (encoded movie data) 600 is decoded. Timing 603 indicates the timing the decoded frame image is displayed. According to the example in FIG. 6, the display timing is delayed by two frames with respect to the decoding. Timing 604 indicates the timing the reproduction time and the frame number are displayed. According to the example illustrated in FIG. 6, only the frame number is displayed. The frame number starts from 1. The reproduction time is calculated according to the frame number as described above and displayed.

When an instruction to start the reproduction is given by using the operation unit 103, the control unit 100 reads the management information file from the storage medium 107 via the storage medium I/F 106, and then stores the management information data in the RAM unit 102. Further, the control unit 100 reads the GOPs (encoded movie data) 600 and 601 in this order, and stores the data in the RAM unit 102. In accordance with the storage of the encoded movie data in the RAM unit 102, the control unit 100 instructs the decoding unit 101 to decode the encoded movie data stored in the RAM unit 102. The decoding unit 101 decodes the encoded movie data and then stores the generated frame image in the RAM unit 102. When the frame image stored in the RAM unit 102 is available for display, the control unit 100 instructs the display unit 104 to display the frame image. The pictures are decoded in the order starting from pictures I2 and B0 in FIG. 6. The first display timing is directly after the frame image of picture B0, which is to be displayed first, is stored in the RAM unit 102. The control unit 100 instructs the display unit 104 to display the frame image of picture B0. Simultaneously, the control unit 100 counts the number of the frame images to be displayed, calculates the reproduction time according to the frame numbers, and instructs the display unit 104 to display the reproduction time and the frame number. On receiving the instruction, the display unit 104 displays the frame image, the reproduction time, and the frame number. The operations starting from the reading of the encoded movie data to the display of the frame image, the reproduction time, and the frame number are continued until a reproduction stop instruction is given via the operation unit 103 or frame images of all the encoded movie data are displayed.

Next, a case where an error has occurred during the reproduction operation will be described with reference to FIG. 7. FIG. 7 illustrates decode timing and display timing of each frame image when an error has occurred. The GOPS 600 and 601 in FIG. 7 are the same as the GOPS (encoded movie data) 600 and 601 described with reference to FIG. 6. Timing 605 indicates the timing each frame of the GOP 600 is decoded. Timing 606 indicates the decoding time of the I picture which has been searched when the error has occurred. Timing 607 indicates the timing the GOP (encoded movie data) 601 is decoded the first time after the reproduction is resumed. Timing 608 indicates the timing the decoded frame image is displayed. A picture 609 is a picture that is a subject of the error at the time the decoding operation is performed. In other words, the picture 609 is a frame including data with error. In FIG. 7, an error has occurred with P8 picture. Timing 610 indicates the timing the reproduction time and the frame number are displayed. In FIG. 7, only the frame numbers and the frame numbers are displayed, starting from 1. As described above, the reproduction time is calculated based on the frame number.

The present exemplary embodiment can be applied to reproduction of encoded movie data that does not include time stamp information such as coding time or display time in the encoded movie data. If an error occurs with encoded movie data that does not include time stamp information, it is important to minimize the disorder of the image as much as possible and to perform processing (search the reproduction resume position) necessary in recovering the error. Thus, if the decoding unit 101 detects an error during decoding, the control unit 100 instructs the display unit 104 to continue displaying an image of a normally-decoded frame which has been decoded directly before the occurrence of the error, the reproduction time of the frame, and its frame number. Accordingly, the display unit 104 displays the frame image, the reproduction time, and the frame number that have been instructed. According to the example illustrated in FIG. 7, when the picture 609, which is an error picture, is generated, the last frame image which has been normally decoded directly before the error picture and which can be displayed is the frame image of P5 picture. Thus, the frame image of P5 picture and the reproduction time and its frame number are continuously displayed.

Further, the control unit 100 searches for the next I picture using the address, the size, and the frame number of the I pictures and the frame numbers of the frames that have been normally decoded which are included in the management information data stored in the RAM unit 102, and reads out data of the searched I picture from the storage medium 107. Then, the data of the I picture that has been read out is stored in the RAM unit 102. The control unit 100 instructs the decoding unit 101 to decode the I picture, and the decoding unit 101 decodes the data of the I picture. According to the example illustrated in FIG. 7, since the frame image of P5 picture is displayed at the time the error is detected, I2 picture, which is the next I picture of the encoded movie data (GOP) 601, is searched for. Then the data of the I2 picture is read out and stored in the RAM unit 102. Then, the I2 picture which has been stored is decoded at the timing 606. The control unit 100 determines whether an error is detected with the I picture as a result of the decoding. If there is an error, the search, the decoding, and the error determination operations of the next I picture will be performed. Similar operations are repeatedly performed until the error is not detected. Although an error is not found with the I2 picture of the GOP (encoded movie data) 601 in the example illustrated in FIG. 7, if an error is detected, decoding of a plurality of different I pictures will be consecutively executed at the timing 606.

If an error is not detected, a frame number of an error-free I picture will be stored. Then, the reproduction is resumed from that position. At the timing 607 that indicates the time the display of the frame image is resumed, the display of the last frame image which has been decoded before the occurrence of the error and has been continuously displayed after the occurrence of the error is terminated, and the frame image of the resumed reproduction is displayed. According to the example illustrated in FIG. 7, at the timing 607, in place of the frame image of the P5 picture which has been displayed up to that time, the display of normal reproduction will be performed starting from the I2 picture of the GOP (encoded movie data) 601. At that time, since the reproduction is resumed from the I2 picture of the GOP 601, decoding of B0 and B1 pictures of the GOP 601 is not performed, and decoding of the P5, B3, and B4 pictures are performed after the I2 picture. After the reproduction of the frame image of the I2 picture of the GOP (encoded movie data) 601 is started, the display of the reproduction time and the frame number is resumed together with the display of the frame image of the I2 picture on the display unit 104. The display is sequentially updated.

Since the I2 picture of the GOP 601 is already decoded at the timing 606 and stored in the RAM unit 102, if the data stored in the RAM unit 102 can be read out, the decoding of the I2 picture is not necessarily repeated at the timing 607.

Further, according to the above-described example, if an error occurs, the subsequent I pictures are searched for one after another in order. However, the search interval can be changed while the search is being performed according to the number of consecutive errors. For example, the I picture may be searched one after another after the occurrence of the error to the ninth error as described above. However, if the error occurs 10 times, then, for example, the 20-th I picture is searched for. In this manner, the search interval of the I picture is increased according to the number of consecutive errors of the I pictures.

Figure 5:
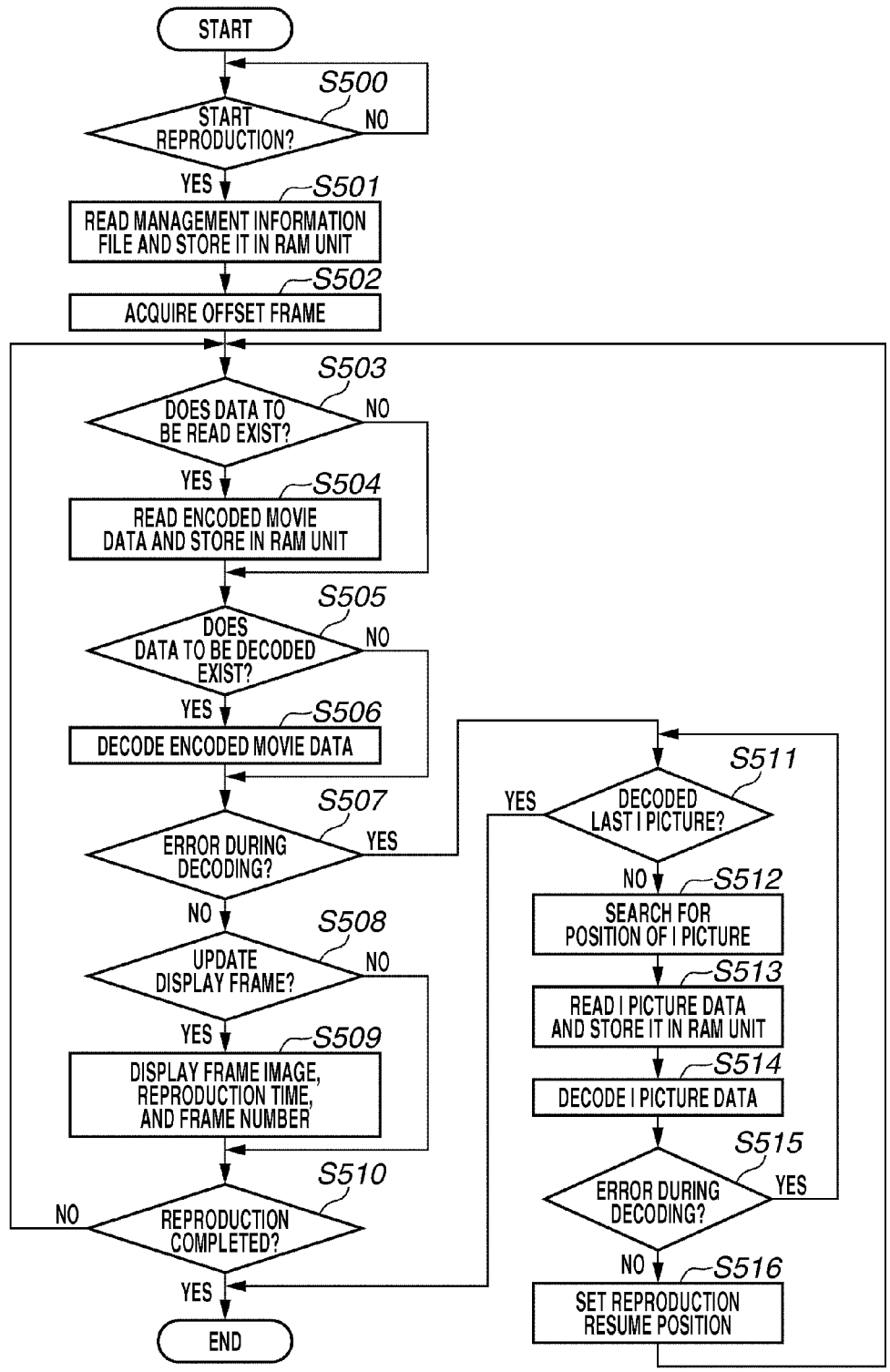
FIG. 5 is a flowchart illustrating reproduction operation of the movie reproducing apparatus according to an exemplary embodiment of the present invention.

FIG. 5 is a flowchart illustrating the reproduction operation of the movie reproducing apparatus according to the present exemplary embodiment. The flowchart illustrates a moving image reproduction method which is executed according to a control program executed by the control unit 100. In step S500, the control unit 100 determines whether an instruction to start reproduction is given by the operation unit 103. If the instruction is given (YES in step S500), the processing proceeds to step S501. If the instruction is not given (NO in step S500), the processing returns to step S500, and the state is changed to a waiting state.

In step S501, the control unit 100 reads the management information file from the storage medium 107, and stores the read out management information data in the RAM unit 102. Then, the processing proceeds to step S502. In step S502, based on the management information data, the control unit 100 acquires an I picture at a point where the starting of the reproduction has been instructed or in a vicinity of that point as an offset frame, and then the processing proceeds to step S503. If the reproduction is started from the top of the encoded movie data, the offset value will be zero.

In step S503, the control unit 100 determines whether there is data to be read out from the encoded movie data recorded in the storage medium 107. If there is data to be read out (YES in step S503), the processing proceeds to step S504. If there is no data to be read out (NO in step S503), then the processing proceeds to step S505. Whether there is data to be read out is determined according to whether there is encoded movie data which is not yet reproduced and whether there is free space in the RAM unit 102. In step S504, the control unit 100 reads the encoded movie data from the storage medium 107 and stores the data in the RAM unit 102. Then the processing proceeds to step S505.

In step S505, the control unit 100 determines whether there is data to be decoded in the RAM unit 102. If data to be decoded is in the RAM unit 102 (YES in step S505), the processing proceeds to step S506. If data to be decoded is not in the RAM unit 102 (NO in step S505), the processing proceeds to step S507. Whether data to be decoded is in the RAM unit 102 is determined according to whether the amount of undecoded data has exceeded a predetermined amount (e.g., whether the amount of undecoded data is one GOP or more). In step S506, the control unit 100 decodes the encoded movie data and stores the generated frame image in the RAM unit 102. Then, the processing proceeds to step S507.

In step S507, the control unit 100 determines whether an error has occurred during the decoding of the encoded movie data. If it is determined that there is no error (NO in step S507), the processing proceeds to step S508. If it is determined that there is an error (YES in step S507), the processing proceeds to step S511. In step S508, the control unit 100 determines whether the displayed frame is to be updated. If the displayed frame is to be updated (YES in step S508), the processing proceeds to step S509. If the displayed frame does not need to be updated (NO in step S508), then the processing proceeds to step S510. Whether the display frame is to be updated is determined by displaying the currently displayed frame for a display time (approximately 33 ms since the standard frame rate of NTSC is 30 frames per second (fps), 1/30=approximately 33 ms), and determining whether the frame that is to be displayed next is a decoding-completed frame.

In step S509, the frame image, the reproduction time, and the frame number are displayed (i.e., the display is updated). The frame number of the displayed frame is stored, and the processing proceeds to step S510. In step S510, the control unit 100 determines whether the reproduction is completed. If the reproduction is completed (YES in step S510), then the processing ends. If the reproduction is still not completed (NO in step S510), the processing returns to step S503. The reproduction is completed when the control unit 100 receives a reproduction stop instruction from the operation unit 103 or when the reproduction of the encoded movie data is completed.

In step S511, the control unit 100 determines whether the last I picture data of the encoded movie data is decoded. If the last I picture is not decoded yet (NO in step S511), the processing proceeds to step S512. If decoding of the entire encoded movie data is completed (YES in step S511), the reproduction operation is stopped and the processing ends.

In step S512, the control unit 100 searches for the position of the subsequent I picture data in the encoded movie data that exists after the occurrence of the error. Then, the processing proceeds to step S513. The search of the next I picture is performed according to the above-described procedure and based on the management information data. In step S513, the control unit 100 reads the I picture data of the encoded movie data, which has been extracted by the search, from the storage medium 107, and stores the data in the RAM unit 102. Then, the processing proceeds to step S514. In step S514, the decoding of the read I picture data is performed. Then, the processing proceeds to step S515.

In step S515, the control unit 100 determines whether an error has occurred during the decoding of the I picture data performed in step S514. If the control unit 100 determines that there is an error (YES in step S515), the processing returns to step S511. Then, the next I picture is searched for. If the control unit 100 determines that there is no error (NO in step S515), the processing proceeds to step S516. In step S516, the control unit 100 determines a position of the error-free I picture as the position where the reproduction is to be resumed when the error is recovered, and sets the frame number of the frame from which the reproduction is to be started. Then, the processing returns to step S503. Then, based on the I picture at the reproduction resume position set in step S516 and the frame number of the I picture, the frame image, the reproduction time, and the frame number are updated in step S509. The descriptions above describe the flowchart illustrated in FIG. 5.

Next, as an alternate version of a search method used for searching an I picture which is performed when an error occurs during the reproduction, an operation useful in changing the search method using a record alignment, which is a record unit of the search storage medium will be described.

Figure 4:
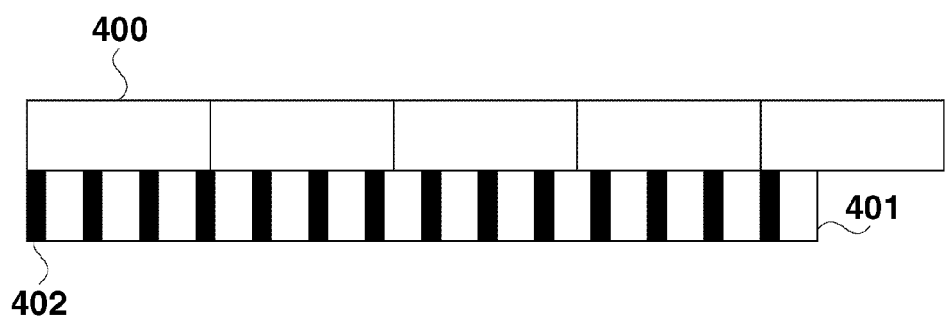
FIG. 4 illustrates a relation between record alignment and encoded movie data.

FIG. 4 illustrates a relation between a record alignment of the storage medium 107 and the encoded movie data stored in the storage medium 107. In FIG. 4, a size 400 is a size of a record alignment. The size of each record alignment is the same. The movie reproducing apparatus according to the present exemplary embodiment uses File Allocation Table (FAT) system as the recording format used in recording data in a storage medium. The FAT system is a widely-used recording format for, for example, video cameras or the like. The record alignment is a writing unit used in the FAT system. The units of the record alignment are, for example, recording unit (RU) and access unit (AU).

In FIG. 4, encoded movie data 401 is stored in the storage medium 107. A portion 402 in the encoded movie data 401, which is filled in with black, is an I picture of the encoded movie data. As can be seen from FIG. 4, a plurality of I pictures are included in one record alignment. Such a case is often seen when encoded movie data of low bit rate is recorded. By determining the address of the I picture of the encoded movie data in the storage medium 107, the record alignment that includes the I picture can be determined.

The control unit 100 includes a record alignment detection unit used for detecting a record alignment of the storage medium 107. Before the reproduction is started, the control unit 100 controls the record alignment detection unit to acquire a size of the record alignment of the storage medium 107 via the storage medium I/F 106.

If an error occurs during the reproduction, the control unit 100 determines the address of the encoded movie data in the storage medium 107 that generated the error and further determines the record alignment to which the address belongs. The control unit 100 searches for the first I picture in a record alignment next to the record alignment with the error, reads data of the I picture from the storage medium 107, and stores the acquired data in the RAM unit 102. Then, the control unit 100 instructs the decoding unit 101 to decode the stored I picture data, and the decoding unit 101 decodes the I picture data. The control unit 100 determines whether an error is included in the result of the decoding. If an error is included, the control unit 100 searches for the first I picture from the next record alignment, and then reads and decodes the searched I picture. Similar operations are continuously performed until no error is detected. Finally, an error-free I picture can be set as the reproduction resume position.

Searching for an I picture in units of the record alignment can be realized by changing the processing in steps S501 and S512 in FIG. 5 described above. In other words, the operation of the record alignment detection unit acquiring a record alignment is added to step S501. Further, step S512 is changed in such a manner that the address of the encoded movie data that has been processed when the error has occurred and the record alignment in the storage medium 107 are acquired, and then the first I picture of the next record alignment is searched for.

Since data error often occurs in units of data writing with respect to the storage medium, acquiring and using the record alignment is effective in prompt recovery from the error.

Next, processing of displaying information of the error period due to, for example, data missing after step S516 in FIG. 5, in other words, after the recovery from the error will be described with reference to FIGS. 8A to 8E. FIGS. 8A to 8E illustrate display processing of error information which is displayed after the recovery from the error.

If encoded movie data including, for example, missing data as described above is used for broadcasting application, the scene including the missing data needs to be deleted or corrected by editing. However, even if a user carefully watches the screen, if the error is such a minor error that the reproduced image and the time code seem as though they had merely stopped for a fraction of a second at the data missing portion, it is difficult for the user to recognize the error. Thus, it is not possible to determine the missing section of the data.

Thus, according to the present exemplary embodiment, at least when the error is recovered, the display unit 104 displays a display form such as the one illustrated in FIGS. 8B to 8E so as to notify the user of the error (error information of the period of the error such as missing data). According to the exemplary embodiment of the present invention, any one out of the display forms illustrated in FIGS. 8B to 8E can be used, or one form out of a plurality of display forms can be selected.

FIG. 8A illustrates an example of a display displayed by the display unit 104 in a state the error information is not displayed. In FIG. 8A, each of frame images 800, 801, and 802, which is being displayed, is presented on time axis. Since an error has occurred with a frame image subsequent to the frame image 801, the frame image 801 is continuously displayed. Further, since the error has been recovered, the frame image 802 is displayed after the recovery of the error. The figures displayed at the upper right corner of the frame images 800, 801, and 802 in FIG. 8A are time codes of the display frame. They are displayed as 00 (hour):01 (minute):10 (second):09 F (frame). Unlike the time code illustrated in FIG. 2, the fractions of a second are not rounded down in the time codes in FIG. 8A. The fractions are displayed in frame units. According to the example in FIG. 8A, the frame at 00:01:10:09 F is the 2109-th frame. Since 1 second corresponds to 30 frames, 2109/30=70 seconds and a remainder of 9 frames. Since 70 seconds correspond to 1 minute and 10 seconds, the time code is 00:01:10:09 F. According to the present exemplary embodiment, the time code begins at 00:00:00:01 F. Further, the time code displayed after 00:00:00:30 F is 00:00:01:01 F. However, the display form is not limited to such a form. For example, the time codes can be set so that the first time code is 00:00:00:00 F and the time code after 00:00:00:29 F is 00:00:01:00 F. The frame image 802 is an I frame which has normally undergone the I picture decoding. The frame image 802 is displayed when the error is recovered and its time code is 00:01:13:18 F.

Figure 8B:
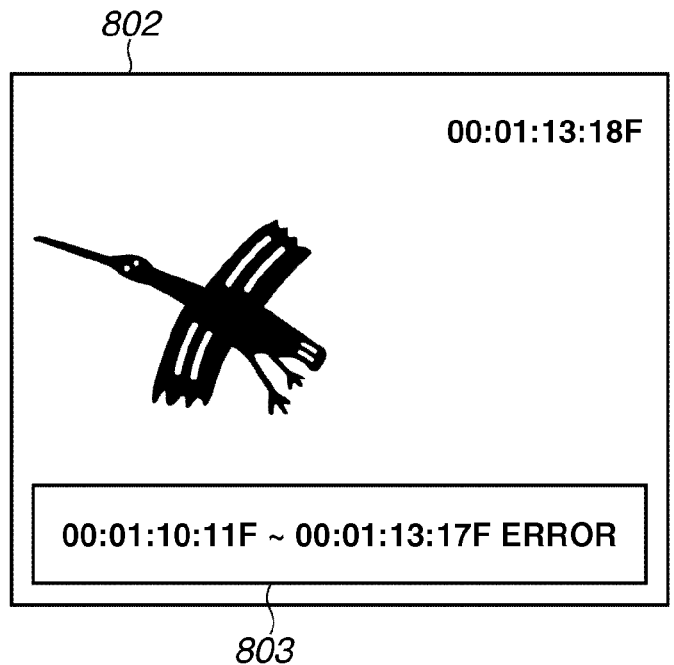

FIG. 8B illustrates an example of the error information notification displayed by the display unit 104. This notification is displayed when the frame image 802 is displayed, in other words, when the recovery from the error is determined. This timing corresponds to timing after step S516 in the flowchart in FIG. 5. At that time, error information 803 is displayed. The error information 803 notifies that the period of the missing frames that are not reproduced due to the error handling is from the frame subsequent to the frame image 801 to the frame before the frame image 802. In other words, the period is from 00:01:10:11 F to 00:01:13:17 F. The content of the display is calculated by the control unit 100 based on the time code value which is updated according to the frame number of the I picture whose reproduction is resumed.

Figure 8C:
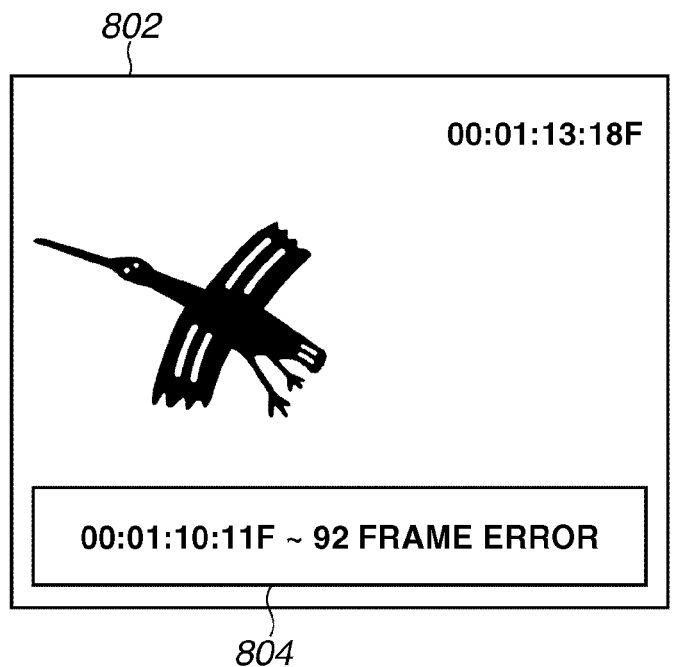

FIG. 8C illustrates another example of the error information notification displayed by the display unit 104. This notification is displayed when the frame image 802 is displayed, in other words, when the recovery from the error is determined. This timing corresponds to timing after step S516 in the flowchart in FIG. 5. At that time, error information 804 is displayed. The error information 804 notifies that the number of the missing frames that are not reproduced due to the error handling is 92 frames from the frame subsequent to the frame image 801, in other words, 00:01:10:11 F. The content of the display is calculated by the control unit 100 based on the time code value and the frame number which are updated according to the frame number of the I picture whose reproduction is resumed.

Figure 8D:
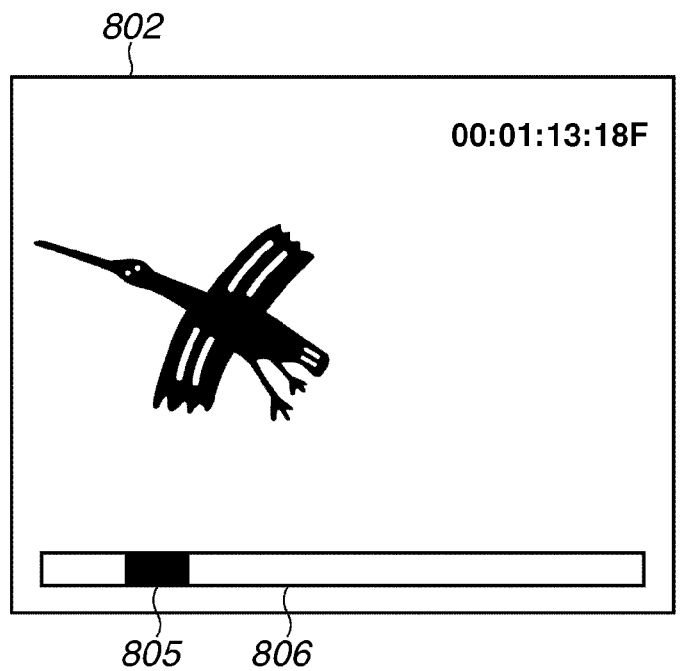

FIG. 8D illustrates another example of the error information notification displayed by the display unit 104. This notification is displayed when the frame image 802 is displayed, in other words, when the recovery from the error is determined. This timing corresponds to timing after step S516 in the flowchart in FIG. 5. At that time, a bar 806 and a portion 805 are displayed. In other words, the bar 806 corresponds the entire encoded movie data and the portion 805 indicates the frame period which has not been reproduced due to, for example, missing data. Since the portion 805 is on time axis of the bar 806, it indicates the position of the frame with the error in the entire encoded movie. Further, the bar 806 can be obtained by calculating "number of I pictures in the encoded movie data"×"number of frames (15) in 1 GOP". Further, the portion 805 can be calculated by the control unit 100 based on the frame number of the frame being reproduced at the time the error occurred and the frame number of the I picture to be displayed when the reproduction is resumed. The form of the display is not limited to a bar display. For example, a textual representation such as "error is detected from 140 GOP to 147 GOP" can be displayed. In other words, error information acquired from the frame number of the I picture and GOP can be converted into any format and displayed.

Figure 8E:
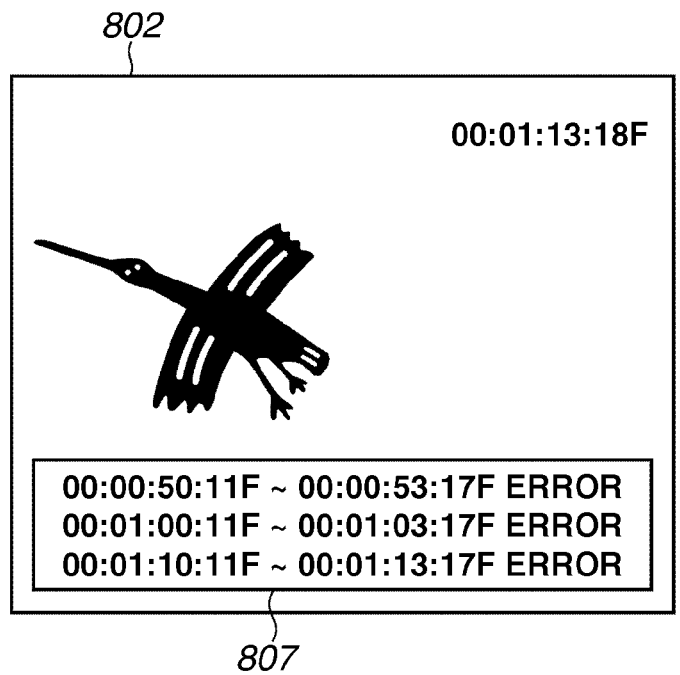

FIG. 8E illustrates another example of the error information notification displayed by the display unit 104. This notification is displayed when the frame image 802 is displayed, in other words, when the recovery from the error is determined. This timing corresponds to timing after step S516 in the flowchart in FIG. 5. At that time, error information 807 is displayed. The error information 807 includes information of a plurality of error periods. The error information 807 shows that until the error is recovered at the frame image 802, the error recovery has been accomplished a total of three times. The first error is from 00:00:50:11 F to 00:00:53:17 F, the second error is from 00:01:00:11 F to 00:01:03:17 F, and the third error is from 00:01:10:11 F to 00:01:13:17 F. The error information which is generated each time the error is recovered is stored in the RAM unit 102 or the storage medium 107 as required, and the error information is brought together and displayed as a whole. The error information can also be displayed in the form described in FIG. 8C or 8D.

Further, it is useful if the display of the error information illustrated in FIGS. 8B to 8E is automatically terminated when a predetermined period of time passes from the start of the display. Furthermore, the display of the error information can be configured in such a manner that the display ends when a display end instruction sent from the user via the operation unit 103 is received.

Figure 9:
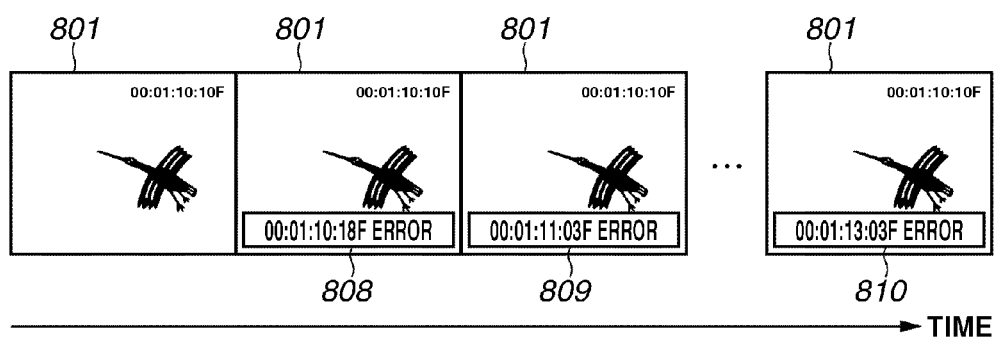
FIG. 9 illustrates error information which is displayed when the error is being handled.

FIG. 9 illustrates error information which is displayed when the error is being handled. In FIG. 9, the frame image 801 is continuously displayed on the display unit 104 while the error is handled. Each piece of error information 808, 809, and 810 is time information displayed by the display unit 104 when an error occurs with the decoding of an I picture while the error is handled. Each piece of error information 808, 809, and 810 is calculated by the control unit 100 according to the frame number of the I picture with the decoding error at timing when step S515 of the flowchart in FIG. 5 is determined to be "YES".

In FIG. 9, the error information 808 is information of a decoding error of the first I picture (00:01:10:18 F) after an error has occurred. The error information 809 is information of a decoding error of the next I picture (00:01:11:03 F). The error information 810 is information of a decoding error of the last I picture (00:01:13:03 F) when the error has been handled. Even if the error is not recovered, it is useful if some display that helps the user recognize time information of the missing frame of the I picture is added.

If error information acquired during the occurrence of the error is stored in the RAM unit 102 or the storage medium 107, the error information can be displayed after the recovery from the error or when reproduction is not being performed. For example, if the user gives an instruction to display error information to the operation unit 103, the error information is displayed on the display unit 104. Further, by storing the error information in the storage medium 107 in a file format such as a management information file or metadata, even if the storage medium 107 is used for a different reproducing apparatus or an external apparatus such as a personal computer, the user can display the error information.

As described above, according to the present exemplary embodiment, even if an error occurs while encoded movie data that does not include time stamp information is reproduced, after recovery from the error, the frame image which is being reproduced can be determined. Thus, correct time information can be displayed. Further, according to the present exemplary embodiment, even if an error occurs while encoded movie data that does not include time stamp information is being reproduced, at least after recovery from the error, information of the period when the error such as missing data has occurred can be displayed. Thus, the error portion can be easily determined.

Each unit that constitutes the movie reproducing apparatus and each step used in the moving image reproduction method according to the above-described exemplary embodiment can be realized by running a program stored in a RAM or a ROM of a computer. The present invention includes such a program and a computer-readable recording medium (storage medium) recording (storing) the program.

The above-described exemplary embodiment can be also realized with, for example, a system, an apparatus, a method, a program, or a recording medium (storage medium). Furthermore, the above-described exemplary embodiment can be realized by a system including a plurality of devices or an apparatus including a single device.

The present invention can be applied to a case where a software program which implements functions of the above-described exemplary embodiment (a program corresponding to the flowchart illustrated in FIG. 5 according to the above-described exemplary embodiment) is supplied to a system or an apparatus directly or remotely, and a computer of the system or the apparatus executes the supplied program code to realize the functions of the above-described exemplary embodiments.

Thus, the program code itself which is installed in the computer to realize the function and the processing of the present invention on the computer constitutes the above-described embodiments. In other words, the computer-executable program configured to realize the function and the processing of the present invention itself constitutes an exemplary embodiment of the present invention.

In this case, the computer-executable program can be provided in the form of object code, a program executable by an interpreter, or script data supplied to an operating system, etc., if it functions as a program.

A computer readable recording medium (storage medium) used for supplying the program includes, for example, a flexible disk, a hard disk, an optical disk, and a magneto-optical disk. Further, a magneto-optical disc (MO), a compact disc read-only memory (CD-ROM), a compact disc-recordable (CD-R), a compact disc-rewritable (CD-RW), a magnetic tape, a non-volatile memory card, a ROM, and a digital versatile disc (DVD) (a digital versatile disc read-only memory (DVD-ROM), and a digital versatile disc-recordable (DVD-R)).

The program can also be supplied to a user by connecting to an Internet website using a browser of a client computer and downloading the computer-executable program of the present invention into a recording medium (storage medium), such as a hard disk. In this case, the program that is downloaded can be a compressed file having an automated install function.

Further, the program code that configures the program of the exemplary embodiment of the present invention can be divided into a plurality of files and each file can be downloaded from different Internet websites. In other words, a World Wide Web (WWW) server which allows a plurality of users to download a program file to realize the functions of the above-described exemplary embodiments also configures the present invention.

Furthermore, the program of the present invention can be encrypted, recorded on a recording medium (storage medium), such as a CD-ROM, and delivered to users. In this case, a user who satisfies a predetermined condition is allowed to download decryption key information from an Internet website via the Internet, to decrypt the encrypted program using the decryption key information, and installs the decrypted program on the computer.

The functions of the above-described exemplary embodiments are implemented when the provided program is executed by a computer. Additionally, an OS running on a computer can realize the functions of the above-described exemplary embodiments by performing the entire or a part of the actual processing based on an instruction from the program.

Furthermore, the program read out from the recording medium (storage medium) is written in a memory in a function expanding board inserted in a computer or a function expanding unit connected to a computer and a CPU provided in the function expanding board or the function expanding unit performs the whole or a part of the actual processing based on an instruction from the program to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-273892, filed Dec. 1, 2009 and Japanese Patent Application No. 2010-203155, filed Sep. 10, 2010 which are hereby incorporated by reference herein in their entirety.

What is claimed is:

1. A movie reproducing apparatus for reproducing encoded movie data that does not include time stamp information, the apparatus comprising:
   a reproduction unit configured to reproduce the encoded movie data from a storage medium;
   a decoding unit configured to decode data reproduced by the reproduction unit;
   a display unit configured to display a moving image and elapsed time information of the moving image based on data decoded by the decoding unit;
   an error detection unit configured to detect an error of the data reproduced by the reproduction unit;
   a storage unit configured to store management information indicating a recording position of an intra-picture coded picture included in the encoded movie data; and
   a control unit configured to perform control in such a manner that if the error is detected by the error detection unit while the reproduction unit is reproducing, based on the management information stored in the storage unit, an intra-picture coded picture subsequent to a frame including data with the error is searched for and the error is recovered,
   wherein, when the error is recovered, the display unit updates elapsed time information to be displayed based on a frame number of the intra-picture coded picture searched by the control unit.

2. The movie reproducing apparatus according to claim 1, wherein the control unit searches for the subsequent intra-picture coded picture in a predetermined order, causes the reproduction unit to perform reproduction, and sets an intra-picture coded picture whose error is no longer detected by the error detection unit as a reproduction resume position.

3. The movie reproducing apparatus according to claim 2, wherein the control unit changes a search interval during a search in such a manner that the search interval is increased according to a number of consecutive error times in the subsequent intra-picture coded data.

4. The movie reproducing apparatus according to claim 1, wherein the control unit searches for the subsequent intra-picture coded picture by a record alignment unit, which is a recording unit of the storage medium, causes the reproduction unit to perform reproduction, and sets an intra-picture coded picture whose error is no longer detected by the error detection unit to a reproduction resume position.

5. A movie reproducing apparatus for reproducing encoded movie data that does not include time stamp information, the apparatus comprising:
   a reproduction unit configured to reproduce the encoded movie data from a storage medium;
   a decoding unit configured to decode data reproduced by the reproduction unit;
   a display unit configured to display a moving image and elapsed time information of the moving image based on data decoded by the decoding unit;
   an error detection unit configured to detect an error of the data reproduced by the reproduction unit;
   a storage unit configured to store management information indicating a recording position of an intra-picture coded picture included in the encoded movie data; and
   a control unit configured to perform control in such a manner that if the error is detected by the error detection unit while reproduction is performed by the reproduction unit, based on the management information stored in the storage unit, an intra-picture coded picture subsequent to a frame including data with the error is searched for and the error is recovered,
   wherein when the error is recovered, the display unit updates elapsed time information to be displayed based on a frame number of the intra-picture coded picture searched for by the control unit and displays error information that includes a period of a frame dropped caused by the error or a number of dropped frames caused by the error.

6. The movie reproducing apparatus according to claim 5, wherein the control unit searches for the subsequent intra-picture coded picture in a predetermined order, causes the reproduction unit to perform reproduction, and sets an intra-picture coded picture whose error is no longer detected by the error detection unit to a reproduction resume position.

7. The movie reproducing apparatus according to claim 6, wherein the display unit displays the error information calculated based on a frame number of the intra-picture coded picture set to the reproduction resume position when the error is recovered.

8. The movie reproducing apparatus according to claim 5, wherein the display unit further displays time information of an intra-picture coded picture dropped due to the occurrence of the error from when the error detection unit detects the error until the error is recovered.

9. A movie reproducing method for reproducing encoded movie data that does not include time stamp information, the method comprising:
   reproducing the encoded movie data from a storage medium;
   decoding the reproduced data;
   displaying a moving image and elapsed time information of the moving image based on the decoded data on a display;
   detecting an error of the reproduced data;
   storing management information indicating a recording position of an intra-picture coded picture included in the encoded movie data;
   performing a control in such a manner that if the error is detected during reproduction of the encoded movie data, based on the stored management information, an intra-picture coded picture subsequent to a frame including data with the error is searched for and the error is recovered, and
   updating elapsed time information to be displayed on the display based on a frame number of the intra-picture coded picture searched by the control unit, when the error is recovered.

10. A movie reproducing method for reproducing encoded movie data that does not include time stamp information, the method comprising:
   reproducing the encoded movie data from a storage medium;
   decoding the reproduced data;
   displaying a moving image and elapsed time information of the moving image based on the decoded data on a display;
   detecting an error of the reproduced data;
   storing management information indicating a recording position of an intra-picture coded picture included in the encoded movie data;
   performing a control in such a manner that if the error is detected during reproduction of the encoded movie data, based on the stored management information, an intra-picture coded picture subsequent to a frame including data with the error is searched and the error is recovered, and updating elapsed time information to be displayed on the display based on a frame number of the intra-picture coded picture searched by the control unit as well as displaying error information indicating a period of frames dropped by the error or a number of frames dropped by the error, when the error is recovered.

* * * * *